United States Patent [19]

Sandberg

[11] 4,142,376
[45] Mar. 6, 1979

[54] CONTROL FOR CRYOGENIC FREEZING TUNNEL

[75] Inventor: Glenn A. Sandberg, Lockport, Ill.

[73] Assignee: Formax, Inc., Mokena, Ill.

[21] Appl. No.: 847,718

[22] Filed: Nov. 2, 1977

[51] Int. Cl.² .............................................. F25D 7/00
[52] U.S. Cl. ...................................... 62/158; 62/223; 236/15 BG
[58] Field of Search .................. 62/64, 158, 223, 231; 432/51; 236/15 BC, 15 BG; 165/12; 364/477

[56] References Cited

U.S. PATENT DOCUMENTS

| | | | |
|---|---|---|---|
| 3,393,868 | 7/1968 | Griem, Jr. ......................... | 236/15 BG |
| 3,613,386 | 10/1971 | Klee .................................... | 62/64 |
| 3,699,694 | 10/1972 | Hales et al. ....................... | 62/158 |

*Primary Examiner*—William E. Wayner
*Attorney, Agent, or Firm*—Kinzer, Plyer, Dorn & McEachran

[57] ABSTRACT

A startup and shutdown control for a cryogenic freezing tunnel for freezing food products in which the rate of flow of cryogen into the tunnel is normally regulated by a thermal regulator, including an auxiliary flow regulator for maintaining a predetermined flow of cryogen to the tunnel independently of the thermal regulator, a first startup interval device, comprising a counter responsive to movement of the tunnel conveyor, for actuating the auxiliary flow regulator to provide a constant flow of cryogen to the tunnel after a first startup interval measured from the initiation of movement of a supply of food products to the tunnel, and a second startup interval device, comprising a timer, to cut off the flow of cryogen via the auxiliary flow regulator after a second startup inverval. The control further includes a first shutdown interval device, which is also a counter, to cut off all cryogen flow to the tunnel after a first shutdown interval measured from the interruption of the food product supply, and a second shutdown interval device, a timer, to restore flow control to the thermal regulator after a second shutdown interval.

12 Claims, 3 Drawing Figures

CONTROL FOR CRYOGENIC FREEZING TUNNEL

BACKGROUND OF THE INVENTION

In high-volume installations for the manufacture of frozen food products, the freezing apparatus frequently comprises a long insulated chamber, called a tunnel, through which the food product passes on an endless belt conveyor. Near the outlet end of the tunnel, the food product is sprayed with a liquified cryogen, frequently liquified nitrogen, as the final freezing step for the product. Cryogen gas, vaporized by contact with the food product and with the conveyor, is directed back through the tunnel in a direction counter to the flow of the food product, progressively chilling the food product as it moves through the tunnel chamber. For effective and consistent operation, it is essential that the food product be subjected to a spray of liquified nitrogen; however, the flow rate for the liquified cryogen spray is regulated to maintain overall thermal conditions within the tunnel within a restricted range and thus avoid excessive wasteful use of the cryogen.

In the course of a normal work shift it may be necessary to interrupt the movement of the food products into and through the freezing tunnel for varying periods and for a variety of different reasons. For example, if the food products being frozen are hamburger patties, any malfunction of upstream equipment may require shutdown of the tunnel for an indeterminate period to permit maintenance personnel to correct the malfunction. Another valid and relatively common reason for a shutdown of freezing tunnel operations is a changeover from one food product to another as, for example, a change from one size hamburger patty to a different size or even a change in the nature of the food product as from hamburger patties to a seafood product such as shrimp or fish.

When the freezing tunnel is shut down for a limited period, as for a food product changeover or for correction of a malfunction of the food product source, the tunnel is maintained at its extremely low working temperature, ready for a new supply of food products. During a shutdown interval of this kind, the thermal regulator for the cryogen input may reduce the flow of cryogen into the tunnel to a very low rate or may even shut off the cryogen flow completely. It is essential that a substantial flow of cryogen into the tunnel be re-established when the tunnel again begins freezing operations. It is also important that the renewed flow of cryogen into the tunnel be accurately timed with respect to the renewed supply of food products; if the cryogen flow rate is increased too soon there may be a substantial waste of the cryogen, whereas if it is not increased soon enough some of the food products may not be properly frozen. Furthermore, startup control is further complicated by the fact that thermal sensors suitable for use at the extremely low temperatures present in a freezing tunnel generally exhibit substantial inertia in operation, making precise timing more difficult than might otherwise be the case.

The latent heat present in food products newly introduced into the tunnel on startup causes a substantial change in thermal conditions within the tunnel on startup. Conversely, an interruption in the supply of food products to the tunnel produces a correspondingly large change in thermal conditions in the tunnel. On shutdown, inertia of the thermal control can cause an appreciable and undesirable waste of cryogen. In general, it has been difficult and sometimes impossible to accommodate short-term changes in the food product supply without substantial loss in efficiency of tunnel operation, either through waste of the cryogen or through failure to achieve proper freezing.

SUMMARY OF THE INVENTION

It is a principal object of the invention, therefore, to provide a new and improved control for a cryogenic freezing tunnel for freezing food products that affords precise and efficient control for both startup and shutdown operations, minimizing or eliminating any waste of the cryogen supplied to the tunnel while assuring effective and proper freezing of the food products. A related object of the invention is to provide a control of this character that is effective even for shutdown intervals of quite short duration.

A particular object of the invention is to provide a new and improved startup control for a cryogenic freezing tunnel for freezing food products that provides at least a limited flow of cryogen into the tunnel in time to assure effective freezing of the first food products entering the tunnel without substantial waste of cryogen, restoring the control over the flow rate of the cryogen to thermal control after a thermal controller has had adequate time to overcome any inherent operational inertia.

Another object of the invention is to provide a new and improved shutdown control for a cryogenic freezing tunnel employed for freezing food products that is effective to shut off all flow of cryogen into the tunnel in precisely timed relation to any interruption in the supply of food products to the tunnel, and to restore the tunnel to thermal control after an interval sufficient to allow a thermal flow regulator for the cryogen supply to overcome any operational inertia.

Another object of the invention is to provide a new and improved startup and shutdown control for a cryogenic freezing tunnel employed in the freezing of food products that is simple and economical in construction and dependable in operation for even quite limited shutdown intervals.

Accordingly, the invention relates to a control for a cryogenic freezing tunnel of the kind comprising an elongated insulated freezing chamber, conveyor means for transporting food products from a food product source into and through the freezing chamber, cryogen spray means for spraying a liquified cryogen onto the food products on the conveyor at a predetermined spray position on the path in the freezing chamber, cryogen conduit means connecting a liquified cryogen supply to the spray means, and thermal regulator means, connected to the cryogen conduit means, for regulating the rate of flow of the cryogen to the spray means over a range between cutoff and a maximum rate of flow in accordance with varying thermal conditions in the chamber. The control comprises auxiliary flow regulator means, connected to the cryogen conduit means that is actuatable between a cutoff condition and a flow condition maintaining a predetermined rate of flow of cryogen to the spray means independently of the thermal regulator means, first startup interval means, coupled to the food product source, for actuating the auxiliary flow regulator means to its flow condition after a first predetermined startup interval beginning with the initiation of a supply of food products from the food product source to the conveyor means, and second startup interval means for actuating the auxiliary flow regulator means to its cutoff condition after a second predetermined startup interval beginning with the termination of the first startup interval. The control further comprises first shutdown interval means, coupled to the food product source, for actuating both the auxiliary flow regulator means and the thermal regulator means to cutoff condition after a first predetermined shutdown interval beginning with the termination of a supply of food products from the food product source to the conveyor means, and second shutdown interval means for releasing the thermal regulator means from its cutoff condition after a second predetermined shutdown interval beginning with the termination of the first shutdown interval.

DESCRIPTION OF THE PREFERRED EMBODIMENTS

Figure 1:
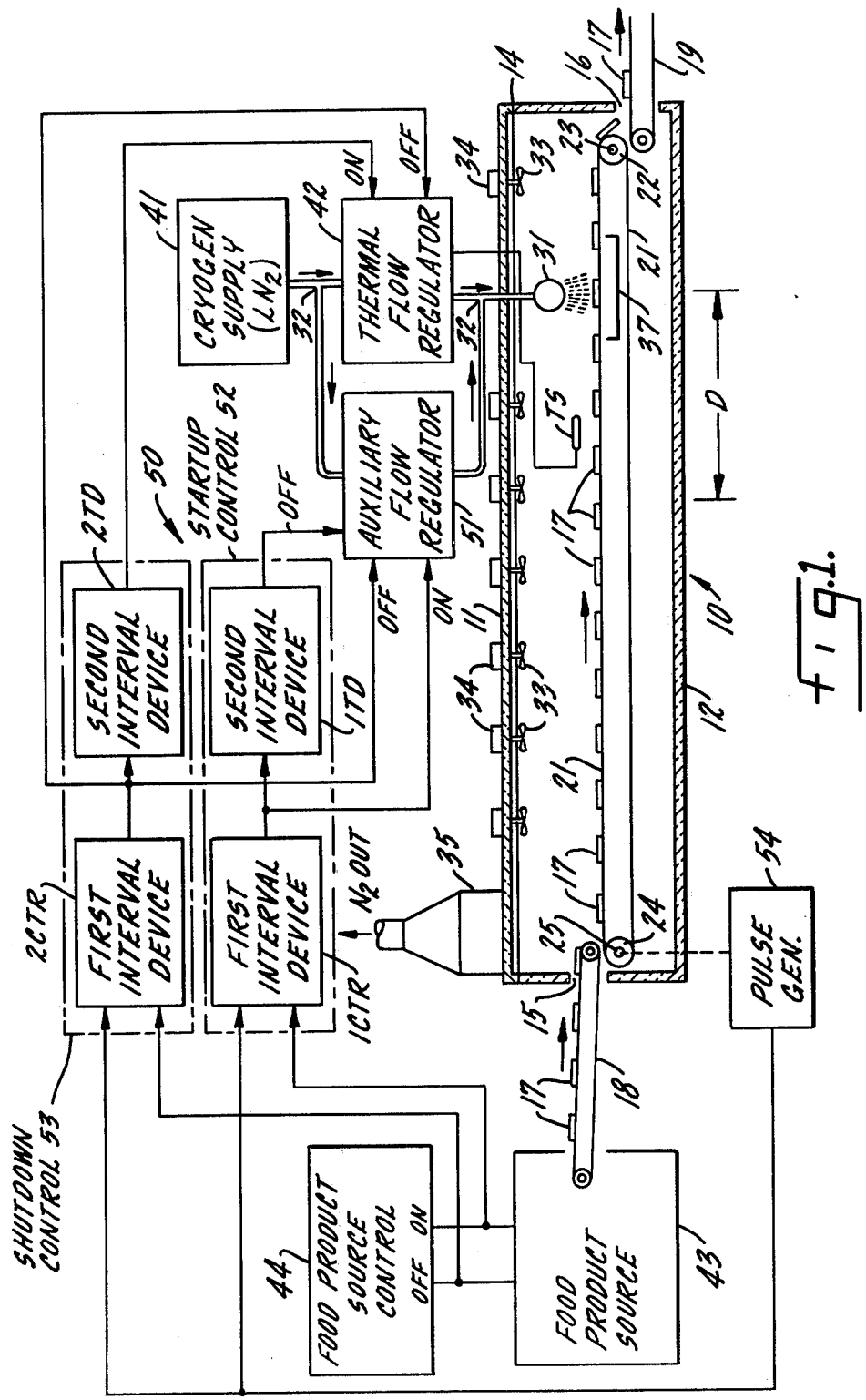
FIG. 1 is a schematic block diagram of a cryogenic freezing tunnel system incorporating a control according to the present invention.

FIG. 1 illustrates a cyrogenic freezing tunnel 10 for fast freezing of food products. Freezing tunnel 10 includes an elongated, insulated chamber comprising a top 11 and a base 12; base 12 is U-shaped in cross-sectional configuration and is sealed against the top 11 by suitable means such as a gasket 14. Base 12 may be suspended from top 11 by a hydraulic elevator mechanism (not shown) to maintain the base 12 in the elevated closed position shown in FIG. 1 and which may also be utilized to lower the base from the tunnel top for periodic cleaning or for servicing of the interior of the tunnel chamber.

At the left-hand end of tunnel 10, as seen in FIG. 1, there is a product entrance opening 15 in base 12; at the other end of the tunnel there is an exit opening 16. Food product 17, which may comprise hamburger patties, steaks, chicken pieces or patties, or any other of a wide variety of food products, enters tunnel 10 through entrance opening 15 on an input conveyor 18 that discharges onto a tunnel conveyor belt 21. The food product 17 is discharged, after passing through tunnel 10, onto a take-away conveyor 19.

The endless conveyor belt 21 extends throughout the length of freezing tunnel 10. At the exit end of the tunnel, adjacent exit opening 16, belt 21 engages a drive pulley 22 mounted on a transverse conveyor drive shaft 23. At the opposite end of the tunnel, adjacent entrance opening 15, belt 21 engages a tensioning pulley 24 mounted upon a shaft 25. Belt 21 is usually a metal belt of open mesh construction. The upper run of belt 21, which carries the food product 17 through tunnel 10, is supported throughout its length by suitable means (not shown). A preferred tensioning drive system for conveyor belt 21 is described and claimed in the co-pending application of Glenn A. Sandberg, Ser. No. 847,719 filed Nov. 2, 1977.

A spray header 31 is supported from the top 11 of tunnel 10, extending across the freezing chamber a short distance from the exit opening 16 of the tunnel. Header 31 is connected, by input conduit means 32, to a supply 41 of liquified nitrogen or other cryogen. A thermal flow regulator 42, described more fully hereinafter, is connected to the cryogen conduit 32. Regulator 42 is also connected to a thermal sensor TS located in tunnel 10 a limited distance ahead of header 31. A series of fans 33 are mounted in the tunnel top 11, throughout the length of the tunnel, powered by motors 34 mounted on the tunnel top 11. An exhaust plenum 35 communicates with the entrance end of tunnel 10, through top 11.

In FIG. 1, the food products 17 are shown to originate with a food product source 43. The food product source may comprise a high-volume food patty molding machine, such as the machine described in U.S. Pat. No. 3,887,964; other machines that may be used as the food product source 43 include shrimp cleaning machines, dough dividers for bakery products, and many others. A control 44 controls startup and shutdown of the food product source 43.

It will be recognized that freezing tunnel 10, as thus far described, is generally conventional, except that the tunnel has been somewhat foreshortened in FIG. 1. In a typical fast-freezing installation for food products, the freezing chamber of tunnel 10 may have an overall length of the order of sixty to eighty feet or more. Furthermore, the number of fans 33 between the exhaust plenum 35 and header 31 is usually much greater than suggested by the drawing. In a typical sixty-five foot tunnel, there might be as many as fifteen fans 33 in this portion of tunnel 10.

Because tunnel 10 is generally conventional, only a brief description of the basic tunnel operation is required. As the food product 17 passes beneath header 31, it is sprayed with a liquid cryogen, in this instance liquified nitrogen. The rate of flow of the liquified cryogen to header 31 is regulated by regulator 42, over a range between cutoff and a maximum flow rate, in accordance with varying thermal conditions in tunnel 10 as sensed by thermal sensor TS. Most of the liquified nitrogen flashes to gas as soon as it makes contact with food product 17 or conveyor belt 21. A collection pan 37 may be provided to collect any excess liquid nitrogen, allowing it to be recycled. Most of the cold nitrogen vapor is drawn through the freezing chamber toward plenum 35 by an exhaust fan (not shown) connected with the plenum. As the cold gas moves toward the exhaust plenum, it is continuously re-directed back into contact with the food product 17 by the fans 33. The portion of the tunnel 10 to the right of header 31, as seen in FIG. 1, serves as a thermal equilibration section. Here, the fans 33 direct the nitrogen vapor into contact with the food product 17 to aid heat removal from its interior before the food product is discharged from conveyor 21 onto take-away conveyor 19.

The basic construction illustrated for tunnel 10 is described in greater detail, particularly with respect to the basic configuration for an elevator-mounted tunnel base, in Kent U.S. Pat. No. 3,757,533. A preferred tunnel construction utilizing the same principles is described in greater detail in the copending application of M. W. Morgan et al., Ser. No. 847,721, filed Nov. 2, 1977. However, it should be understood that the startup and shutdown control system of the present invention, as described below, can be applied with equal effectiveness to freezing tunnels of very different construction.

The cryogenic freezing tunnel system illustrated in FIG. 1 includes a control 50 constructed in accordance with the present invention. Control 50 includes an auxiliary flow regulator 51 connected to the conduit means 32 between cryogen supply 41 and spray header 31. Regulator 51 is actuatable between a cutoff condition and a flow condition; in its flow condition, it maintains a predetermined rate of flow of cryogen through conduit 32 from supply 41 to header 31 independently of the thermal flow regulator 42. Preferably, that auxiliary flow rate is set at substantially less than the maximum flow rate possible with thermal regulator 42.

Control 50 further comprises a startup control 52 and a shutdown control 53. The startup control 52 includes a first startup interval device 1CTR having an output connected to the auxiliary flow regulator 51 and to a second startup interval device 1TD which also has an output to regulator 51. There are two inputs to the first interval device 1CTR; one is an actuating input from the control 44 for food product source 43, and the other is derived from a signal pulse generator 54 driven from the tunnel conveyor comprising belt 21. Pulse generator 54 develops a series of signal pulses representative of incremental movements of conveyor belt 21 through tunnel 10. Thus, each pulse from generator 54 is directly representative of movement of food product 17 a predetermined distance into the tunnel.

Shutdown control 53, in the system shown in FIG. 1, is generally similar to startup control 52; it includes a first interval device 2CTR, preferably a pulse counter, having output connections to regulator 51 and to a second shutdown interval device 2TD, preferably a timer. There is also an output connection from device 2CTR to the thermal flow regulator 42. The output of the second shutdown interval device 2TD is connected to the thermal flow regulator 42. In shutdown control 53, device 2CTR has an actuating input derived from the control 44 for food product source 43 and an additional input from pulse generator 54.

As a starting point for consideration of operation of control 50, it may be assumed that tunnel 10 has been in sustained operation, freezing food products 17 received in a continuing stream from food product source 43. At some time, in order to perform limited maintenance on the machine comprising source 43, to replenish an input of food to source 43 for molding or other processing therein, or even for a lunch or coffee break, the system operator may decide to shut down the system. Accordingly, the operator actuates control 44 to shut down food product source 43. As a consequence, an OFF signal is applied to the first interval device 2CTR in shutdown control 53, actuating that counter to begin a count of pulses from pulse generator 54.

Counter 2CTR is set to count out at a pulse count indicative of movement of the last of the food products 17 to a point just beyond spray header 31 in tunnel 10. When counter 2CTR counts out, OFF signals are supplied to both of the cryogen flow regulators 42 and 51, actuating both regulators to cutoff condition. This interrupts all flow of cryogen to spray header 31 in tunnel 10. At the same time, an actuating signal is applied to the second shutdown interval device 2TD in control 53.

Device 2TD is a conventional timer, set to time out after an interval sufficient to allow the thermal regulator 42 and its sensing device TS to adjust to the major change in thermal conditions in tunnel 10 occasioned by interruption of the stream of food products 17 entering the tunnel. This time interval is essentially constant for any given thermal flow regulator apparatus. Typically, it may be of the order of four or five minutes. When timer 2TD times out, an ON signal is effectively applied to flow regulator 42 to release that regulator from its cutoff condition and permit it to resume its normal temperature-based control of the flow of cryogen to header 31 in tunnel 10.

With tunnel 10 shut down as described above, the heat losses from the tunnel are quite limited, particularly because there is no stream of food products 17 entering the tunnel. Accordingly, only a very small flow of cryogen to header 31 is necessary to maintain the interior of tunnel 10 in its freezing temperature range. Indeed, at times the flow of cryogen into the tunnel may be interrupted completely by regulator 42.

To resume freezing operations in tunnel 10, the system operator actuates control 44 to start food product source 43 again supplying food products 17 to the tunnel. An ON actuating signal is applied to the first startup interval device in control 52, the pulse counter 1CTR Counter 1CTR is set to a pulse count correlated to movement of the first of the new stream of food products 17 to a point spaced upstream from header 31, in tunnel 10, by a limited distance D. Typically, distance D may be of the order of ten feet.

When the new supply of food products 17 reaches a point in tunnel 10 at a distance D upstream of header 31, counter 1CTR counts out and applies an ON signal to the auxiliary flow regulator 51 in control 50. This ON signal actuates regulator 51 to its ON or flow condition, in which the regulator establishes and maintains a predetermined rate of flow of cryogen to spray header 31 independently of thermal regulator 42. Thus, although the thermal flow regulator 42 may be at or near cutoff at the end of the first startup interval measured by counter 1CTR, a substantial flow of cryogen to header 31 is established and subsequently maintained through regulator 51. This assures an adequate spray of liquified nitrogen or other cryogen onto food product 17 in system startup.

The output signal from counter 1CTR is also applied to the second startup interval device 1TD, which may be a conventional timer. Timer 1TD is set to measure a time interval sufficient to allow the thermal flow regulation system comprising sensor TS and regulator 42 to overcome its operational inertia and effectively recognize the major change in thermal conditions in the tunnel caused by the renewed stream of food products 17 into the tunnel. Typically, this time interval may be of the order of seven to eight minutes. When timer 1TD times out, it applies an OFF signal to the limited flow regulator 51. Accordingly, regulator 51 is actuated to its cutoff condition, interpreting the flow of cryogen to header 31 that has been maintained by the auxiliary regulator. Subsequently, as long as tunnel 10 is maintained in operation, the flow of cryogen to spray header 31 through conduit means 32 is controlled by thermal regulator 42.

From the foregoing description, it is seen that control 50, on startup, establishes an adequate supply of cryogen to spray header 31 in tunnel 10 in time to assure proper freezing of the first of the stream of food products 17 entering the tunnel. This eliminates possible adverse effects due to the operational inertia of the thermal flow regulation apparatus comprising regulator 42 and sensor TS. Furthermore, the waste that would be attendant upon an increase of cryogen flow before the new stream of food products approaches header 31 is avoided.

By utilizing a pulse generator 54 geared to conveyor 21 as the basic input for the first startup interval device 1CTR, control 50 is effectively made independent of changes of conveyor speed as far as startup control is concerned. Thus, control 50 requires no change in operation even though conveyor 21 may be varied in speed over a wide range to accommodate changes in operation of food source 43 or even a complete substitution of one food source for another. Of course, if a substitution of food product sources is made there must be a suitable change in the operating input connections to counter 1CTR so that it will be properly started in its measurement of the first startup interval. By the same token, on startup the control of cryogen flow is restored to thermal regulator 42 in time to avoid waste of cryogen that might occur if sustained flow through regulator 51 were maintained over too long an interval.

The same advantages are apparent with respect to shutdown as controlled by unit 53 of control 50. Counter 2CTR operates to shut off all flow of cryogen to header 31, by actuating both of the regulators 42 and 51 to cutoff, immediately after the last food products have cleared spray header 31. Again, this control function is maintained precise even though the speed of conveyor 21 may be varied over a broad range, since the output from pulse generator 54 that is measured by counter 2CTR is indicative of an interval of belt movement and not of time. On the other hand, timer 2TD assures restoration of effective thermal control by restoring regulator 42 to its normal operational condition after a time interval sufficient to overcome the inertia of the thermal regulation apparatus so that tunnel 10 does not reach an undesirable elevated temperature.

The control 50, as described, in measuring a first interval of conveyor displacement and a second interval of time for both startup and shutdown, is highly advantageous for any system in which the speed of conveyor 21 may vary to any appreciable extent. However, in a constant-speed installation the first intervals could be measured in terms of time or, if desired, all intervals could be measured in terms of conveyor displacement.

Figure 2:
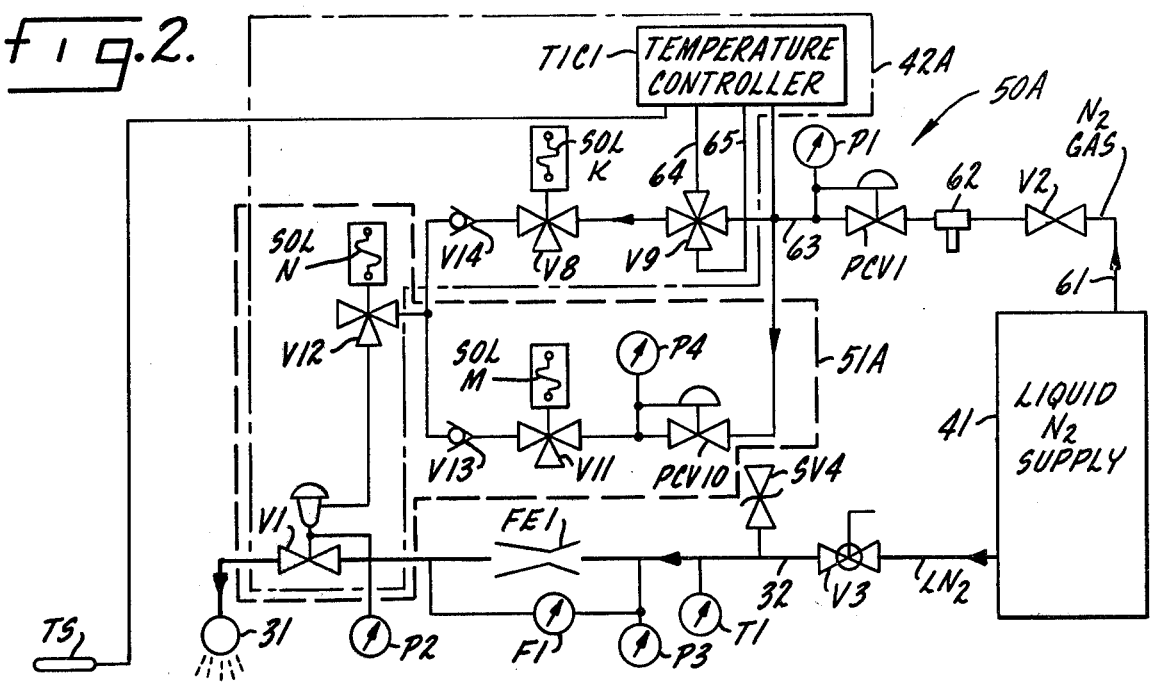
FIG. 2 is a detailed schematic illustration of a pneumatic control constructed in accordance with a preferred embodiment of the invention.

FIG. 2 illustrates the cryogen conduit and regulator apparatus 50A utilized in a preferred embodiment of the present invention. In system 50A the liquified nitrogen conduit 32 includes, in series, a ball valve V3 used as a manual shutoff, a safety relief valve SV4, a venturi FE1, and a main flow rate control valve V1. To assist an operator in interpreting and controlling overall system operation, a series of gauges are connected to the liquified nitrogen conduit 32. These include a vapor pressure thermometer T1, calibrated in pressure terms and utilized primarily to determine whether conduit 32 contains any appreciable amount of gas. A direct reading pressure gauge P3 is provided. A differential pressure gauge F1 connected across venturi FE1 is calibrated in terms of flow rate to afford a direct readout of the cryogen flow rate. An additional pressure gauge P2 provides a reading of the pressure applied to valve V1 by its control element and is calibrated in terms of cryogen flow to the spray header 31.

The regulator apparatus illustrated in FIG. 2 is pneumatically actuated, the supply of gas under pressure required to operate the system being drawn directly from the top of the liquid cryogen supply 41 through a conduit 61. Conduit 61 includes, in series, a manually operated shutoff valve V2, a filter 62, and an adjustable pressure regulating valve PCV1 equipped with a pressure gauge P1.

The thermal flow regulator means 42A in FIG. 2 comprises a commercial pneumatically-actuated temperature control unit TIC1 that is connected to the temperature sensing bulb TS. A pneumatic input connection to temperature controller TIC1 is provided from the section 63 of pneumatic control line 61. There is a pneumatic control output 64 from controller TIC1 to a mode control valve V9 with a reset or balancing return to the controller through a line 65. Valve V9 has an input connection from the pneumatic line 63 and an output through a valve V8, a check valve V14, and a shutoff valve V12 that is connected to the control element of the flow rate control valve V1 in conduit 32. Valve V8 is opened by energization of its solenoid SOL K. Valve V12 is arranged to be closed by energization of its solenoid SOL N.

Valve V9 is a dual mode device; in an automatic mode of operation it modifies the pressure of gas supplied to the control element of valve V1 whereas in a manual mode it is effectively full open at all times. For manual mode operation, independent of controller TIC1, cryogen flow control can be exercised by manual adjustment of valve PCV1. This manual mode is usually reserved for emergency situations, as in case of a malfunction of controller TIC1 or sensor TS.

In FIG. 2, the auxiliary flow regulator means 51A comprises a pressure regulating valve PCV10, equipped with a pressure gauge P4, that is connected to the pneumatic supply line 63. The output from valve PCV10 is connected to the control element of the cryogen flow control valve V1 through a pneumatic circuit that includes a solenoid-actuated shutoff valve V11, a check valve V13, and valve V12. Valve V11 is arranged to be opened by eneergization of its solenoid SOL M. Valve V12 and the main flow rate control valve V1 are common to both the thermal flow regulator means 42A and the auxiliary flow regulator means 51A.

In normal operation of the system shown in FIG. 2, when tunnel 10 is continuously freezing food products, nitrogen gas from the cryogen supply 41 is supplied to the temperature controller TIC1 at a regulated pressure through valve V2, filter 62, and pressure regulator PCV1. Controller TIC1 functions to vary the pressure of gas supplied to the control element of flow rate control valve V1 through a pneumatic circuit comprising valve V9, V8, V14 and V12. Solenoid SOL N is not energized, so that valve V12 stays open; solenoid SOL K is energized to keep valve V8 open. Solenoid SOL M in regulator unit 51A is not energized for this mode of operation, so that the rate of flow of liquid cryogen to header 31 through valve V1 is controlled by controller TIC1 based on thermal changes sensed by sensor TS.

To assure an adequate flow of liquified cryogen to the tunnel spray header 31 upon conclusion of the first startup interval determined by counter 1CTR (FIG. 1), solenoid SOL M in regulator 51A (FIG. 2) is energized. This opens valve V11 to supply nitrogen gas, at a pressure determined by the setting of valve PCV10, through valve V11, V13 and V12 to the control mechanism for valve V1. In this manner, regulator 51A serves to establish a predetermined flow of liquid cryogen to header 31 through valve V1, independently of the thermal regulator apparatus 42A, during the second startup interval determined by timer LTD (FIG. 1). For complete shutdown of liquid cryogen flow to header 31, during the second shutdown interval measured by timer 2TD (FIG. 1), solenoid SOL N of valve V12 (FIG. 2) is energized. This prevents any supply of gas to the flow rate control valve V1 and cuts off all flow of liquid cryogen to the spray header.

Figure 3:
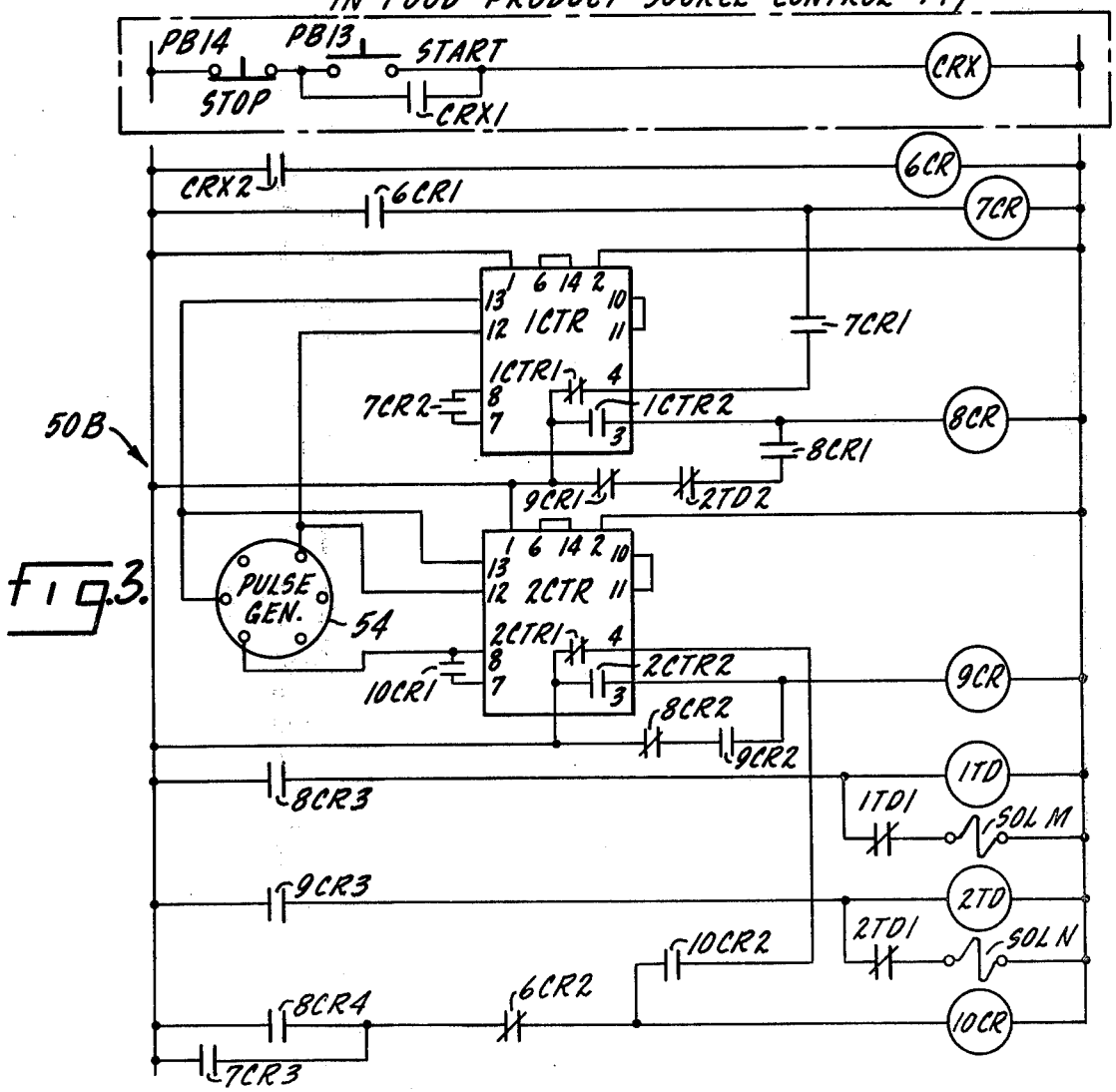
FIG. 3 is a detailed electrical schematic for the control of FIG. 2.

FIG. 3 is a schematic circuit diagram for an electrical control 50B employed to actuate the pneumatic regulator apparatus of FIG. 2. The operation is as described below.

Startup Sequence, FIG. 3

The startup sequence for the freezing tunnel 10 is initiated by closing a start switch PB13 that is a part of the food product source control 44, energizing a control relay coil CRX. With coil CRX energized, a set of contacts CRX1 close to establish a holding circuit for the coil. Another set of relay contacts CRX2 close to complete an operating circuit for a control relay coil 6CR that is a part of the electrical portion of control system 50B for tunnel 10. With coil 6CR energized, a pair of relay contacts 6CR1 close to energize a startup sequence control relay coil 7CR and another pair of contacts 6CR2 open to prevent energization of another control relay coil 10CR.

With relay coil 7CR energized, its contacts 7CR1 close to establish a holding circuit for the coil through a pair of normally closed contacts 1CTR1 in the pulse counter 1CTR. A second set of contacts 7CR2 close to actuate counter 1CTR and start the measurement of the first startup interval by counting pulses from pulse generator 54. A third set of contacts for the same relay, contacts 7CR3, also close, but produce no change in the operation of the circuit because they are in series with the contacts 6CR2 that have been opened previously.

Counter 1CTR measures the first startup interval by counting pulses from generator 54. When the counter counts out, its internal contacts 1CTR1 open. This opens the hold circuit for control relay coil 7CR through its contacts 7CR1 but coil 7CR remains energized through the contacts 6CR1 if the food product source 43 (FIG. 1) remains in operation with relays CRX and 6CR held energized. When counter 1CTR counts out, its internal contacts 1CTR2 close to energize a control relay coil 8CR.

With coil 8CR energized, a set of contacts 8CR1 close to establish a holding circuit for the coil. Another set of contacts 8CR2 open to prevent energization of a relay coil 9CR. A pair of contacts 8CR4 close, but this produces no change in circuit operation because contacts 8CR4 are in series with contacts 6CR2, which were previously opened. In addition, a set of relay contacts 8CR3 close to establish an operating circuit for the operating coil of timer 1TD and for the solenoid SOL M. Thus, when counter 1CTR has counted out, signalling completion of the first startup interval, SOL M is energized to open valve V11 and establish the desired limited flow of cryogen to spray header 31 (FIG. 2) and timer 1TD begins the measurement of the second startup interval (FIG. 1).

When timer 1TD times out, its contacts 1TD1 (FIG. 3) open to de-energize solenoid SOL M. This shuts off the auxiliary flow of gas to the control element of valve V1 through valve V11 (FIG. 2). With regulator 51A thus driven to its cutoff condition, at the end of the second startup interval, continuing control of the flow of cryogen to header 31 is assumed by thermal regulator 42A.

Shutdown Sequence

At the beginning of a shutdown sequence, in most instances, operating conditions will be as described above for the termination of the startup sequence, with control relay coils 6CR, 7CR, and 8CR (FIG. 3) all energized. In addition, the operating coil 1TD for the second startup interval device will remain energized but the timer will have timed out with its contacts 1TD1 open and solenoid SOL M de-energized.

The system operator begins a shutdown sequence by actuation of a stop switch PB14 that is a part of the food product source control 44. This de-energizes control relay coil CRX. Contacts CRX1 open so that coil CRX is not energized again when switch PB14 is released by the operator. Contacts CRX2 also open, de-energizing coil 6CR. As a consequence, contacts 6CR1 open to de-energize coil 7CR (the holding circuit for coil 7CR is already open at counter contacts 1CTR1). In addition, contacts 6CR2 return to their normal closed condition; because relay 8CR remains energized, an operating circuit is established for a shutdown sequence control relay coil 10CR.

With coil 7CR now de-energized, contacts 7CR1 open to prepare the circuit for a subsequent startup operation. Furthermore, contacts 7CR2 open to preclude any additional counting by counter 1CTR and to re-set that counter. Contacts 7CR3 open but this makes no difference to circuit operation because the parallel contacts 8CR4 are closed.

With coil 10CR energized as noted above, a set of relay contacts 10CR1 close, actuating counter 2CTR to begin counting pulses from pulse generator 54 and thus begin measurement of the first shutdown interval for the system. Another set of contacts 10CR2 also close, establishing a holding circuit for coil 10CR through a pair of normally closed internal contacts 2CTR1 of counter 2CTR.

As noted above, the counter 2CTR is set to measure a pulse count indicative of clearance of the last food products, following shutdown of the food product source, past the spray header in the freezing tunnel. When counter 2CTR completes this count, its contacts 2CTR1 open, interrupting the holding circuit for relay coil 10CR. However, coil 10CR remains energized through contacts 8CR4 and 6CR2. In addition, the counter contacts 2CTR2 close to energize a control relay coil 9CR.

With coil 9CR energized, the contacts 9CR1 of this relay open to interrupt the holding circuit for coil 8CR. Since counter 1CTR has reset, coil 8CR is de-energized and its contacts 8CR1, 8CR3 and 8CR4 all open. The opening of contacts 8CR3 opens the operating circuit for timer 1TD and allows that timer to reset. The opening of contacts 8CR4 drops out relay 10CR. In addition, the contacts 8CR2 return to their normally closed condition to complete a holding circuit for relay coil 9CR through its own contacts 9CR2, which are now closed.

With coil 9CR energized, a set of relay contacts 9CR3 close to energize the operating coil for timer 2TD and start that timer measuring the second shutdown interval for the tunnel control. In addition, closing the contacts 9CR3 establishes an energizing circuit for the solenoid SOL N which actuates valve V12 to shut off all flow of gas to the control element of valve V1 and thus cut off all flow of liquified nitrogen to the spray header 31 of the tunnel (FIG. 2). Accordingly, it is seen that when the counter 2CTR has completed its measurement of the first shutdown interval, and actuates control relay 9CR to energize solenoid SOL N, the valve V12 that is common to both the flow regulator 42A and the auxiliary flow regulator 51A is actuated to cutoff condition to stop all flow of cryogen to the tunnel.

When timer 2TD times out, signalling completion of the second shutdown interval, its contacts 2TD1 open to de-energize solenoid SOL N. This opens valve V12 (FIG. 2) and restores the system to its normal thermal control. In addition, a pair of contacts 2TD2 in the holding circuit for control 8CR open to assure de-energization of that relay.

Overlapping Startup and Shutdown Sequences

In the foregoing description for the electrical control circuit of FIG. 3, it has been implicitly assumed that startup and shutdown sequences are completely separated in time. However, that need not be true in all instances. It is entirely possible that a shutdown of the food product source 43 (FIG. 1) could occur a short time interval after startup, during either the first startup interval measured by counter 1CTR or the second startup interval measured by timer 1TD. Similarly, a startup could occur a short interval after shutdown so that the operator would initiate a new startup sequence before completion of the shutdown sequence controlled by counter 2CTR and timer 2TD. The electrical control 50B of FIG. 3 can accommodate either of these overlapping sequence situations.

As a first example, it may be assumed that the system operator determines that it is necessary or desirable to stop system operation at a time when the startup sequence is in progress and counter 1CTR is still engaged in the measurement of the first startup interval. At this time, as noted above, control relay 7CR is energized and counter 1CTR is counting pulses from pulse generator 54.

When the operator actuates stop switch PB14, coil CRX is de-energized, contacts CRX1 open to assure continued de-energization of coil CRX when the operator releases stop switch PB14, and contacts CRX2 open to de-energize coil 6CR. Contacts 6CR1 open, but the startup sequence relay coil 7CR is not de-energized; the relay is held in through its holding circuit comprising contacts 7CR1 and 1CTR1. Accordingly, contacts 7CR3 remain closed whereas contacts 6CR2 return to their normal closed condition so that coil 10CR is energized to initiate a shutdown sequence by actuating counter 2CTR.

It is thus seen that the shutdown sequence can be initiated before the startup sequence is completed. Both control sequences will proceed to completion, in overlapping relation, with a supply of liquid cryogen to header 31 initiated by regulator 51A when the first patties reach a point a distance D upstream of the header (FIG. 1) and a subsequent resumption of control by thermal regulator 42A at the end of the startup sequence. The shutdown sequence ends after the startup sequence and the cryogen supply to header 31 is cut off when the last of the food products passes header 31, all as described above.

As a second example, it may be assumed that in the course of a shutdown sequence, with relay coil 10CR energized and counter 2CTR counting pulses from generator 54 to measure the first shutdown sequence interval, the system operator closes start switch PB13 to initiate a new supply of food products to tunnel 10 from source 43 (FIG. 1). Referring to FIG. 3, it is seen that coil CRX will again be energized, closing its holding circuit contacts CRX1 and also closing contacts CRX2 to energize coil 6CR. As a consequence, contacts 6CR1 close to energize relay coil 7CR and initiate a new startup sequence. Contacts 6CR2 open, but this does not de-energize coil 10CR; that coil remains energized through its holding circuit comprising contacts 10CR2 and 2CTR1. It is thus seen that a new start sequence can be initiated in the middle of a shutdown sequence with no adverse effect.

Although the invention can be implemented with many different counter, timer, and pneumatic devices, identification of a few key components for the controls illustrated in FIGS. 2 and 3 may be of some assistance in affording a more concrete example; it should be understood that this information is provided solely by way of illustration and in no sense as a limitation on the invention. Thus, in FIG. 3 the counters 1CTR and 2CTR are Automatic Timing Controls type 334 counters, pulse generator 54 is an Encoder Products model 711 device, and timers 1TD and 1TD are Automatic Timing Controls type 319 on-delay timers. In FIG. 2, temperature controller TIC1, made control valve V9, and pressure regulator valves PCV1 and PCV10, with their gauges P1 and P4, are all part of a complete unit available as Foxboro No. 43AP-PA42.

It will be recognized that it is not essential to employ a combined pneumatic and electrical control as described in conjunction with the specific preferred embodiment of FIGS. 2 and 3. Thus, a complete electrical control could be utilized. On the other hand, for a cryogenic freezing tunnel it has been found preferable to employ a pneumatic system as the basic flow regulation control, as indicated in FIG. 2. A separate compressed air supply could be employed to power the pneumatic regulator system; however, since cryogen gas under pressure is readily available from the liquified supply 42, it is generally more economical to use this source as described above.

I claim:

1. A control for a cryogenic freezing tunnel of the mind comprising an elongated insulated freezing chamber, conveyor means for transporting food products from a food product source into and through the freezing chamber, cryogen spray means for spraying a liquified cryogen onto the food products on the conveyor at a predetermined spray position on the path in the freezing chamber, cryogen conduit means connecting a liquified cryogen supply to the spray means, and thermal regulator means, connected to the cryogen conduit means, for regulating the rate of flow of the cryogen to the spray means over a range between cutoff and a maximum rate of flow in accordance with varying thermal conditions in the chamber, the control comprising:

auxiliary regulator means, connected to the cryogen conduit means, actuatable between a cutoff condition and a flow condition maintaining a predetermined rate of flow of cryogen to the spray means, independently of the thermal regulator means;

first startup interval means, coupled to the food product source, for actuating the auxiliary flow regulator means to its flow condition after a first predetermined startup interval beginning with the initiation of a supply of food products from the food product source to the conveyor means;

and second startup interval means for actuating the auxiliary flow regulator means to its cutoff condition after a second predetermined startup interval beginning with the termination of the first startup interval.

2. A control for a cryogenic freezing tunnel, according to claim 1, in which the auxiliary flow regulator means, in its flow condition, maintains a rate of flow of cryogen that is substantially less than the maximum rate of flow through the thermal regulator means.

3. A control for a cryogenic freezing tunnel, according to claim 1, including a signal pulse generator, driven by the conveyor means, for generating a series of signal pulses representative of incremental movements of the conveyor through the freezing chamber;

and in which the first startup interval means comprises a pre-settable pulse counter, having a pulse input connected to the pulse generator and an actuation input effectively coupled to the food product source, for measuring the first startup interval, so that the first startup interval is a direct function of conveyor displacement indicative of the position of the first food products entering and traversing the freezing chamber on startup.

4. A control for a cryogenic freezing tunnel, according to claim 3, in which the pulse counter is set to a count that fixes the end of the first startup interval to coincide with arrival of the first food products at a position a given distance D upstream of the spray header, within the freezing chamber.

5. A control for a cryogenic freezing tunnel, according to claim 3, in which the second startup interval means comprises a timer actuated by the pulse counter of the first startup interval means.

6. A control for a cryogenic freezing tunnel, according to claim 5, in which the timer is an electrical timer set to a second startup interval corresponding approximately to the inertia period of the thermal regulator means in responding to an abrupt increase in temperature.

7. A control for a cryogenic freezing tunnel, according to claim 1, and further including a shutdown control comprising:

first shutdown interval means, coupled to the food product source, for actuating both the auxiliary flow regulator means and the thermal regulator means to cutoff condition after a first predetermined shutdown interval beginning with the termination of a supply of food products from the food product source to the conveyor means;

and second shutdown interval means for releasing the thermal regulator means from its cutoff condition after a second predetermined shutdown interval beginning with the termination of the first shutdown interval.

8. A control for a cryogenic freezing tunnel, according to claim 7, including a signal pulse generator, driven by the conveyor means, for generating a series of signal pulses representative of incremental movements of the conveyor through the freezing chamber;

in which the first startup interval means comprises a pre-settable pulse counter, having a pulse input connected to the pulse generator and an actuation input effectively coupled to the food product source, for measuring the first startup interval, so that the first startup interval is a direct function of conveyor displacement indicative of the position of the first food products entering and traversing the freezing chamber on startup;

and in which the first shutdown interval means comprises a pre-settable pulse counter, having a pulse input connected to the pulse generator and an actuation input effectively coupled to the food product source, for measuring the first shutdown interval, so that the first shutdown interval is a direct function of conveyor displacement indicative of the position of the last food products entering and traversing the freezing chamber on shutdown.

9. A control for a cryogenic freezing tunnel, according to claim 8, in which the pulse counter of the first startup interval means is set to a count that fixes the end of the first startup interval to coincide with arrival of the first food products at a position a given distance D upstream of the spray header within the freezing chamber, and the pulse counter of the first shutdown interval means is set to a count that fixes the end of the first shutdown interval to coincide with movement of the last food products through a point downstream of the spray header.

10. A control for a cryogenic freezing tunnel, according to claim 9, in which the second startup interval means comprises a timer actuated by the pulse counter of the first startup interval means and in which the second shutdown interval means comprises a timer actuated by the pulse counter of the first shutdown interval means.

11. A control for a cryogenic freezing tunnel, according to claim 10, in which each timer is an electrical timer actuated by the associated pulse counter and set to a second interval corresponding approximately to the inertia period of the thermal regulator means in responding to an abrupt change in thermal conditions in the freezing chamber.

12. A control for a cryogenic freezing tunnel, according to claim 11, in which the counters and timers are interconnected by electrical control circuit means permitting initiation of a first startup interval during either of the shutdown intervals and further permitting initiation of a first shutdown interval during either of the startup intervals without interruption of the interval already in progress.

* * * * *